(12) United States Patent
Sato

(10) Patent No.: US 6,251,813 B1
(45) Date of Patent: Jun. 26, 2001

(54) OPTICAL GLASS AND ITS USE

(75) Inventor: Kouichi Sato, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/299,619

(22) Filed: Apr. 27, 1999

(30) Foreign Application Priority Data

Apr. 28, 1998  (JP) .................................................. 10-118077

(51) Int. Cl.$^7$ .............................. C03C 3/066; C03C 3/068
(52) U.S. Cl. .............................. 501/78; 501/79; 501/900; 501/901; 501/902; 501/903
(58) Field of Search .............................. 501/78, 79, 900, 501/901, 902, 903

(56) References Cited

U.S. PATENT DOCUMENTS

| | | | |
|---|---|---|---|
| 4,057,435 | * | 11/1977 | Boudot et al. ............................ 501/78 |
| 4,128,432 | * | 12/1978 | Komorita et al. ........................ 501/78 |
| 4,166,746 | * | 9/1979 | Ishibashi et al. ........................ 501/78 |
| 4,469,800 | * | 9/1984 | Boudot et al. ............................ 501/78 |
| 4,732,875 | * | 3/1988 | Sagara et al. ............................ 501/78 |

FOREIGN PATENT DOCUMENTS

| | | | |
|---|---|---|---|
| 35 35575 | * | 4/1996 | (DE) . |
| 61-146721 | | 7/1986 | (JP) . |
| 62-100449 | * | 5/1987 | (JP) . |
| 7-51446 | | 6/1995 | (JP) . |
| 8-059282 | * | 3/1996 | (JP) . |
| 8-259257 | | 10/1996 | (JP) . |
| 2616958 | | 3/1997 | (JP) . |
| 10-226533 | * | 8/1998 | (JP) . |

\* cited by examiner

*Primary Examiner*—David R. Sample
(74) *Attorney, Agent, or Firm*—Nixon & Vanderhye

(57) ABSTRACT

An optical glass having properties of a high refractive index and low dispersion and having both a low sag temperature $T_s$ and a low liquidus temperature L.T., is provided. The optical glass comprises, by % by weight, 25 to 42% of $B_2O_3$, 14 to 30% of $La_2O_3$, 2 to 13% of $Y_2O_3$, 2 to 20 of $SiO_2$, greater than 2% and 9% or less of $Li_2O$, 0.5 to 20% of $CaO$, 2 to 20% of $ZnO$, 0 to 8% of $Gd_2O_3$, 0 to 8% of $ZrO_2$, $Gd_2O_3+ZrO_2$ being 0.5 to 12%, the total content thereof being at least 90%, and optionally contains 0 to 5% of $Na_2O$, 0 to 5% of $K_2O$, 0 to 5% of $MgO$, 0 to 5% of $SrO$, 0 to 10% of $SrO$, 0 to 10% of $BaO$, 0 to 5% of $Ta_2O$, 0 to 5% of $Al_2O_3$, 0 to 5% of $Yb_2O_3$, 0 to 5% of $Nb_2O_5$, 0 to 2% of $As_2O_3$ and 0 to 2% of $Sb_2O_3$.

5 Claims, 1 Drawing Sheet

OPTICAL GLASS AND ITS USE

FIELD OF THE INVENTION

The present invention relates to an optical glass, a precision-press shapeable material formed of the optical glass, and an optical part formed of the optical glass. More specifically, it relates to an optical glass suitable for producing a high-refractivity low-dispersion optical part by press shaping, a precision-press shapeable material formed of the optical glass and an optical part formed of the optical glass.

PRIOR ART OF THE INVENTION

A method of precision-press shaping a glass is a method in which a glass preform is shaped, under pressure and at a high temperature, into a glass product having a form of an end product or a form very close thereto and having a surface accuracy by means of a shaping mold having a predetermined cavity. In the above precision-press shaping method, shaped articles having a predetermined form can be produced with high productivity. Therefore, various optical parts of glass such as a spherical lens, a non-spherical lens, a diffraction grating, etc., have come to be produced by precision-press shaping, and various optical glasses suitable for precision-press shaping have been accordingly developed.

For producing an optical part of a glass by precision-press shaping, it is required to press-shape a glass preform at a high temperature as described above, and a shaping mold used for the above production is therefore also exposed to a high temperature and a high pressure exerted thereon. It is therefore desired to decrease the sag temperature $T_s$ of the glass preform to the lowest level possible, in view of prevention of damage which is caused on the shaping mold per se and a release film provided on the internal surface of the shaping mold by a high-temperature environment during the press shaping.

When a glass preform for precision-press shaping is produced, a glass having a high liquidus temperature L.T. is liable to devitrify and is therefore poor in mass-productivity, so that it is desirable that the liquidus temperature L.T. of the glass should be as low as possible.

As an optical glass with a high refractivity (used to refer to a refractive index $n_d$ of at least 1.675 in the present specification), a low dispersion (used to refer to an Abbe's number $v_d$ of at least 50 in the present specification) and a low sag temperature $T_s$, there are known (1) a glass of $SiO_2$—$B_2O_3$—($Li_2O$, $Na_2O$, $K_2O$)—$ZnO$—$La_2O_3$ system (see JP-A-8-259257), (2) a glass of $SiO_2$—$B_2O_3$—$La_2O_3$—$Gd_2O_3$—$Li_2O$—$CaO$—$BaO$ system (see Japanese Patent No. 2,616,958), and the like.

However, the above glass (1) has a defect that when it is attempted to produce a glass having an Abbe's number $v_d$ of at least 50, the glass shows a liquidus temperature L.T. of as high as approximately 1,000° C. so that the glass is poor in mass-productivity, or that the glass easily devitrifies so that it is poor in mass-productivity.

The above glass (2) has a defect that when it is attempted to produce a glass having a refractive index $n_d$ of at least 1.675, it shows a liquidus temperature L.T. of over 1,000° C. so that it is poor in mass-productivity.

SUMMARY OF THE INVENTION

Under the circumstances, it is a first object of the present invention to provide an optical glass which can be easily obtained as an optical glass having the properties of a high refractive index and low dispersion and having both a low sag temperature $T_s$ and a low liquidus temperature L.T.

It is a second object of the present invention to provide a precision-press shapeable material which can easily give a precision-press shaped article formed of an optical glass having properties of a high refractive index and low dispersion.

It is a third object of the present invention to provide an optical part formed of an optical glass having properties of a high refractive index and low dispersion, by precision-press shaping with high productivity.

The present inventors have made diligent studies to achieve the above objects, and have found that an optical glass comprising specific amounts of specific components as essential components and optional components can fulfill the above objects. On the basis of the above finding, the present invention has been completed.

That is, according to the present invention, the first object of the present invention is achieved by an optical glass comprising, as essential components, boron oxide, lanthanum oxide, yttrium oxide, silicon oxide, lithium oxide, calcium oxide, zinc oxide and at least one of gadolinium oxide and zirconium oxide, the contents of these essential components by % by weight being 25 to 42% of boron oxide, 14 to 30% of lanthanum oxide, 2 to 13% of yttrium oxide, 2 to 20% of silicon oxide, greater than 2% but up to 9% of lithium oxide, 0.5 to 20% of calcium oxide, 2 to 20% of zinc oxide, 0 to 8% of gadolinium oxide and 0 to 8% of zirconium oxide, the total content of gadolinium oxide and zirconium oxide being 0.5 to 12%, the total content of these essential components being at least 90%, the optical glass further comprising, as optional components, by % by weight, 0 to 5% of sodium oxide, 0 to 5% of potassium oxide, 0 to 5% of magnesium oxide, 0 to 5% of strontium oxide, 0 to 10% of barium oxide, 0 to 5% of tantalum oxide, 0 to 5% of aluminum oxide, 0 to 5% of ytterbium oxide, 0 to 5% of niobium oxide, 0 to 2% of arsenic oxide and 0 to 2% of antimony oxide.

According to the present invention, the above second object of the present invention is achieved by a precision-press shapeable material formed of the above optical glass.

According to the present invention, the above third object of the present invention is achieved by an optical part produced by precision-press shaping a material formed of the above optical glass into the part in a mold comprising an upper mold member and a lower mold member and having a predetermined cavity.

DETAILED DESCRIPTION OF THE INVENTION

Figure 1:
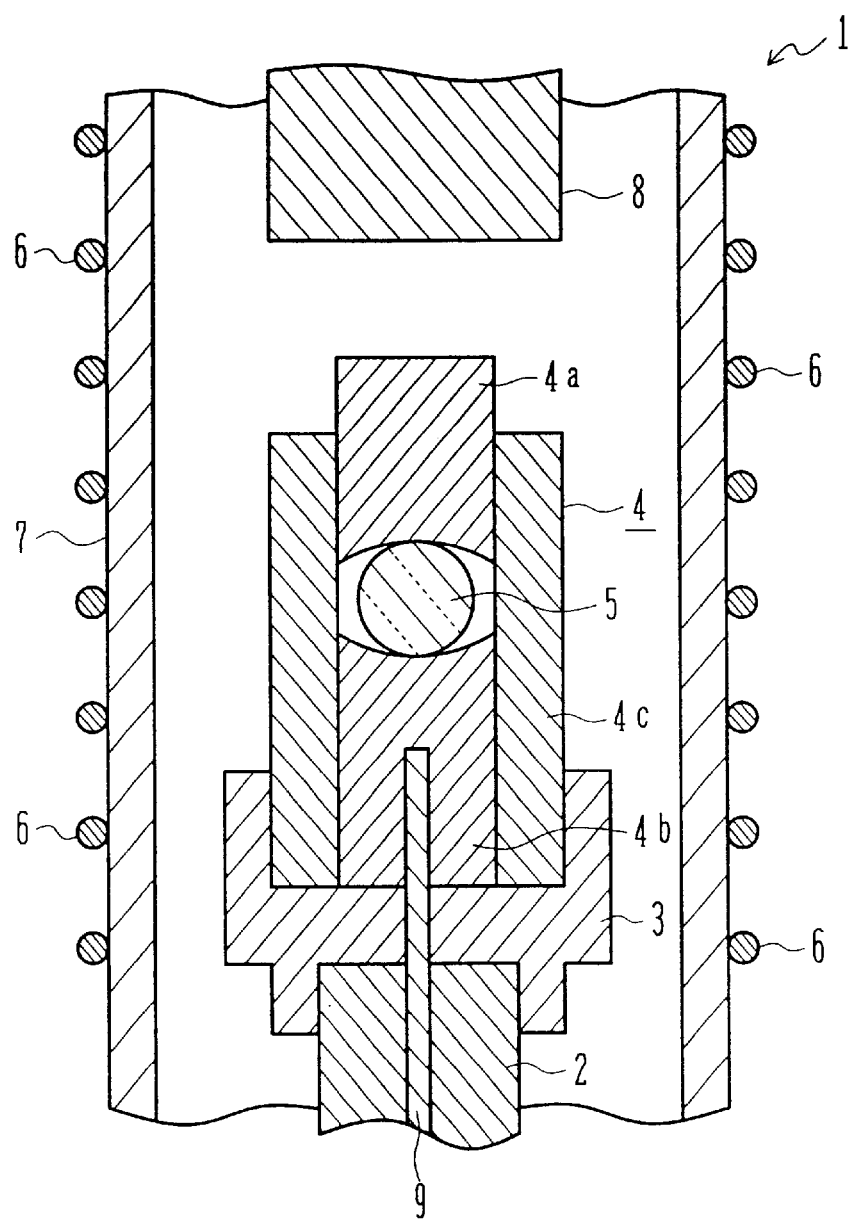
FIG. 1 is a schematic cross-sectional view of one example of a precision-press shaping apparatus.

Modes of practice of the present invention will be explained hereinafter.

First, the optical glass of the present invention will be explained below.

As described above, the optical glass of the present invention comprises, as essential components, boron oxide, lanthanum oxide, yttrium oxide, silicon oxide, zinc oxide, lithium oxide, calcium oxide and at least one of gadolinium oxide and zirconium oxide. The contents of these essential components by % by weight are 25 to 42% of boron oxide, 14 to 30% of lanthanum oxide, 2 to 13% of yttrium oxide, 2 to 20% of silicon oxide, greater than 2% but up to 9% of lithium oxide, 0.5 to 20% of calcium oxide, 2 to 20% of zinc oxide, 0 to 8% of gadolinium oxide and 0 to 8% of zirconium oxide, the total content of gadolinium oxide and zirconium oxide is 0.5 to 12%, and the total content of these essential components is at least 90%.

Properly, the above optical glass is classified as lanthanum crown glass, and boron oxide is therefore an essential glass-forming component. When the boron oxide content is less than 25% by weight, the devitrification resistance of the glass is liable to decrease. When it exceeds 42% by weight, it is difficult to obtain a high-refractivity glass.

Lanthanum oxide and yttrium oxide are essential components for obtaining a high-refractivity low-dispersion optical glass (lanthanum crown glass). When the lanthanum oxide content is less than 14% by weight, or when the yttrium oxide content is less than 2% by weight, it is difficult to obtain a high-refractivity low-dispersion optical glass even if these components are incorporated. When the lanthanum oxide content exceeds 30% by weight, or when the yttrium oxide content exceeds 13% by weight, the devitrification resistance of the glass is liable to decrease.

When incorporated into a glass of $B_2O_3$—$La_2O_3$ system, silicon oxide produces an effect that the glass is improved in devitrification resistance. Silicon oxide is therefore essential in the present invention. When the silicon oxide content is less than 2% by weight, it is difficult to obtain the above effect. When it exceeds 20% by weight, it is difficult to obtain a glass having a high refractive index $n_d$.

Lithium oxide is essential for decreasing the sag temperature $T_s$ of the glass. When the lithium oxide content is equivalent to, or less than, 2% by weight, the glass is liable to have a sag temperature $T_s$ of over 600° C., and the glass having a sag temperature $T_s$ of over 600° C. is not suitable for producing a desired shaped article by precision-press shaping. When the lithium oxide content exceeds 9% by weight, the devitrification resistance of the glass is liable to decrease.

Calcium oxide produces an effect that a glass of a $B_2O_3$—$La_2O_3$ system is improved in devitrification resistance while retaining the high-refractivity low-dispersion properties of the glass. Calcium oxide is therefore essential in the present invention. When the calcium oxide content is less than 0.5% by weight, it is difficult to obtain the above effect. When it exceeds 20% by weight, it is difficult to obtain a glass having a high refractive index $n_d$.

Like calcium oxide, zinc oxide produces an effect that a glass of a $B_2O_3$—$La_2O_3$ system is improved in devitrification resistance while retaining the high-refractivity low-dispersion properties of the glass. Further, it also decreases the sag temperature $T_s$ of the glass. Zinc oxide is therefore essential in the present invention. When the zinc oxide content is less than 2% by weight, the effect based on the incorporation of zinc oxide is not fully exhibited. When it exceeds 20% by weight, the devitrification resistance of the glass is liable to decrease.

When incorporated in proper amounts, gadolinium oxide and zirconium oxide improve the devitrification resistance of the glass, respectively. In the present invention, therefore, at least one of these two components is incorporated. When gadolinium oxide alone is incorporated, and when the gadolinium oxide content exceeds 8% by weight, reversely, the devitrification resistance of the glass is liable to decrease. Similarly, when zirconium oxide alone is incorporated, and when the zirconium oxide content exceeds 8% by weight, reversely, the devitrification resistance of the glass is liable to decrease. When the total content of gadolinium oxide and zirconium oxide is less than 0.5% by weight, or when it exceeds 12% by weight, the liquidus temperature L.T. of the glass is liable to increase.

By combining the above essential components in the above content ranges, and optionally by incorporating other components (optional components), there can be easily obtained an optical glass having a refractive index $n_d$ of at least 1.675, an Abbe's number $v_d$ of at least 50, a sag temperature $T_s$ of approximately 600° C. or lower and a liquidus temperature L.T. of less than 1,000° C.

When the above optional components are incorporated for obtaining an optical glass having the above properties, the total content of the above essential components is required to be at least 90% by weight. As optional components, there may be incorporated, by % by weight, 0 to 5% of sodium oxide, 0 to 5% of potassium oxide, 0 to 5% of magnesium oxide, 0 to 5% of strontium oxide, 0 to 10% of barium oxide, 0 to 5% of tantalum oxide, 0 to 5% of aluminum oxide, 0 to 5% of ytterbium oxide, 0 to 5% of niobium oxide, 0 to 2% of arsenic oxide and 0 to 2% of antimony oxide.

Each of sodium oxide and potassium oxide included in the optional components work to decrease the sag temperature $T_s$ of the glass. When the sodium oxide content exceeds 5% by weight, the devitrification resistance of the glass is liable to decrease. That is, the liquidus temperature L.T. of the glass is liable to increase. Similarly, when the potassium oxide content exceeds 5% by weight, the devitrification resistance of the glass is liable to decrease, and the liquidus temperature L.T. of the glass is liable to increase.

The optical constants ($n_d$, $v_d$) of the glass can be adjusted by selecting magnesium oxide, strontium oxide, barium oxide, tantalum oxide and aluminum oxide whose contents are within the above ranges, as required. However, when the content of any one of these optional components exceeds the corresponding range above, the liquidus temperature L.T. of the glass is liable to increase, and the devitrification resistance thereof is liable to decrease.

Ytterbium oxide and niobium oxide work to improve the glass in devitrification resistance when added in a proper amount each. However, when the content of either of these optional components exceeds the corresponding range above, reversely, the devitrification resistance of the glass is liable to decrease.

Each of arsenic oxide and antimony oxide works as a refining agent or a clarifying agent when added in a proper amount each. However, when the content of either of them exceeds the above range, the liquidus temperature L.T. of the glass is liable to increase, and the devitrification resistance of the glass is liable to decrease.

As already described, the optical glass of the present invention can be easily obtained as an optical glass having a refractive index $n_d$ of at least 1.675, an Abbe's number $v_d$ of at least 50, a sag temperature $T_s$ of approximately 600° C. or lower and a liquidus temperature L.T. of less than 1,000° C. When a glass has a liquidus temperature L.T. of less than 1,000° C., the glass can be easily mass-produced. When a glass has a sag temperature $T_s$ of approximately 600° C. or lower, it is suitable as a material (press-shapeable material (glass preform) or glass as a material therefor) for mass-producing predetermined shaped articles by press shaping.

The optical glass of the present invention is therefore suitable for mass-producing optical parts having properties of a high refractive index and low-dispersion by precision-press shaping with high productivity. Naturally, it can be also used as a material for producing predetermined articles by press-shaping, machining or cutting, in addition to its use as a material for the above production by precision-press shaping.

In view of all of a refractive index $n_d$, an Abbe's number $v_d$, a sag temperature $T_s$ and a liquidus temperature L.T. of the optical glass, preferred is an optical glass which has essential component contents, by % by weight, of 27 to 39% of boron oxide, 16 to 28% of lanthanum oxide, 4 to 12% of yttrium oxide, 4 to 18% of silicon oxide, 2.5 to 8% of lithium oxide, 1 to 18% of calcium oxide, 3 to 18% of zinc oxide, 0 to 6% of gadolinium oxide and 0 to 7% of zirconium oxide, the total content of the gadolinium oxide and the zirconium oxide being 0.5 to 11%, the total content of these essential components being at least 92%, and which also has optional component contents, by % by weight, of 0 to 3% of sodium oxide, 0 to 3% of potassium oxide, 0 to 3% of magnesium oxide, 0 to 3% of strontium oxide, 0 to 7% of barium oxide, 0 to 3% of tantalum oxide, 0 to 3% of aluminum oxide, 0 to 3% of ytterbium oxide, 0 to 3% of niobium oxide, 0 to 2% of arsenic oxide and 0 to 2% of antimony oxide.

More preferred is an optical glass which has essential component contents, by % by weight, of 28 to 37% of boron oxide, 17 to 27% of lanthanum oxide, 5 to 10% of yttrium oxide, 5 to 16% of silicon oxide, 3 to 7% of lithium oxide, 2 to 16%, more preferably 4 to 14 of calcium oxide, 4 to 17%, more preferably 6 to 15%, of zinc oxide, 0 to 5% of gadolinium oxide and 0 to 6% of zirconium oxide, the total content of the gadolinium oxide and the zirconium oxide being 0.5 to 10%, the total content of these essential components being at least 93%, and which also has optional component contents, by % by weight, of 0 to 3% of sodium oxide, 0 to 3% of potassium oxide, 0 to 3% of magnesium oxide, 0 to 3% of strontium oxide, 0 to 6% of barium oxide, 0 to 3% of tantalum oxide, 0 to 3% of aluminum oxide, 0 to 3% of ytterbium oxide, 0 to 3% of niobium oxide, 0 to 2% of arsenic oxide and 0 to 2% of antimony oxide.

Particularly preferred is an optical glass which has essential component contents, by % by weight, of 30 to 36% of boron oxide, 18 to 25% of lanthanum oxide, 6 to 10% of yttrium oxide, 6 to 12% of silicon oxide, 3 to 6% of lithium oxide, 5 to 12% of calcium oxide, 7 to 13% of zinc oxide, 0.5 to 4% of gadolinium oxide and 1 to 5% of zirconium oxide, the total content of the gadolinium oxide and the zirconium oxide being 1.5 to 8%, the total content of these essential components being at least 95%, and which also contains, as an optional component, 0 to 2% by weight of niobium oxide.

The above optical glass of the present invention can be obtained by the following method. First, predetermined amounts of raw materials for an intended glass composition are weighed, and these raw materials are mixed to prepare a formulated material. The formulated material is melted in a melting furnace at a temperature of 1,150 to 1,350° C. to obtain a glass melt, and the glass melt is refined and stirred to obtain a homogeneous glass melt. Then, the homogeneous glass melt is shaped into a desired form and gradually cooled, to give the optical glass of the present invention. For the above production, $B_2O_3$, $H_3BO_3$, or the like is used as a raw material for the boron oxide, $Al_2O_3$, $Al(OH)_3$, or the like is used as a raw material for the aluminum oxide, and carbonates, nitrates, oxides, etc., of cation elements constituting the intended components are used as required as raw materials for the other components.

The precision-press shapeable material of the present invention will be explained hereinafter.

As already explained, the precision-press shapeable material of the present invention is formed of the optical glass of the present invention.

The form of the precision-press shapeable material is not specially limited, and the precision-press shapeable material has the form of a sphere, a marble, a flat plate, a column, a pole, a round loaf, or the like depending upon the form of a shaped article to be obtained by precision-press shaping.

The method of producing the precision-press shapeable material of the present invention having the above advantage is not specially limited, and it can be properly selected from a cold processing such as cutting and polishing, the method disclosed in JP-A-61-146721, or the method disclosed in JP-B-7-51446 depending upon an intended form, and the like.

The precision-press shapeable material of the present invention is formed of the already explained optical glass of the present invention, i.e., the optical glass which can be easily obtained as a product having a refractive index $n_d$ of at least 1.675, an Abbe's number $v_d$ of at least 50 and a sag temperature $T_s$ of approximately 600° C. or lower. The precision-press shapeable material of the present invention therefore easily gives a precision-press shaped article having properties of a high refractive index and low-dispersion.

The optical part of the present invention will be explained hereinafter.

The optical part of the present invention is obtained by precision-press shaping a material formed of the above optical glass of the present invention into a part in a mold comprising an upper mold member and a lower mold member and having a predetermined cavity.

The above optical part may be any part that can be obtained by press shaping. Specific examples of the optical part include optical elements such as a spherical lens, a non-spherical lens and a prism. Further, the optical part has an optically functioning surface having a surface accuracy equivalent to the surface accuracy of a final product, while it may be cut or polished to a very small degree as required. Further, a portion other than the optically functioning surface, e.g., an edge portion may be post-processed to adjust its diameter as required.

The above optical product is not limited in kind, and the form of the above material formed of the optical glass of the present invention is accordingly not specially limited in form. The above material can have the form, for example, of a sphere, a marble, a flat plate, a column, a pole, a sphere, a round loaf, or the like as required depending upon the form and kind of an optical product as an end product.

The optical part of the present invention can be produced according to a press-forming method which is the same as a conventional press-forming method except that the above material formed of the optical glass of the present invention is used. When the optical part of the present invention is produced by precision-press shaping, various precision-press shaping apparatus such as an apparatus shown in FIG. 1 can be used.

FIG. 1 shows a cross-sectional view of one example of the precision-press shaping apparatus. In the precision-press shaping machine 1 shown in FIG. 1, a support block 3 is disposed in one end of a support rod 2, and a shaping mold 4 constituted of an upper mold member 4a, a lower mold member 4b and a guide mold member (sleeve) 4c is disposed on the support block 3. A material (glass preform) 5 is placed on a shaping surface of the lower mold member 4b, the upper mold member 4a is placed thereon, and then they are arranged in a quartz tube 7 having a circumferential winding of a heater 6. The above upper mold member 4a is movable, and during the precision-press shaping, a load is exerted from above the above upper mold member 4a in the perpendicular direction with a pressing rod 8. Inside the above lower mold member 4b, further, a thermocouple 9 is inserted through the support rod 2 and the support block 3, and temperatures of the shaping mold 4 are monitored through the above thermocouple 9. The material (glass preform) 5 has the form, for example, of a sphere.

The precision-press shaping with the above precision-press shaping apparatus is carried out as follows. The heater 6 is electrically turned on, to heat the shaping mold 4 in the quartz tube 7 and the material 5 (glass preform) 5 in the mold 4 up to a predetermined temperature, i.e., a temperature at which the material (glass preform) 5 has a viscosity, e.g., of approximately $10^5$ to $10^{7.5}$ Pa·s (Pascal·second). Then, the pressing rod 8 is moved downward to press the upper mold member 4a from above, to press the material (glass preform) 5 in the shaping mold 4. In the press shaping, the pressure and the time period for the pressing are determined as required in view of the viscosity of the material (glass preform) 5 and the like. For example, the pressure is set at 50 to 100 kg/cm$^2$, and the pressing is carried out for 10 to 120 seconds. After the pressing, a shaped article is taken out of the shaping mold 4 after the temperature of the shaping article come down to around its glass transition temperature, and it is further cooled, whereby a predetermined optical article is obtained.

When the temperature for the press shaping is approximately 650° C. or lower, the deterioration of the shaping mold by heat can be easily prevented. When the material to be shaped into an article is a glass, and when the glass has a sag temperature $T_s$ of approximately 600° C. or lower, the temperature for the press shaping can be set at approximately 650° C. or lower. And, the optical glass of the present invention can easily give a shaped article having a refractive index $n_d$ of at least 1.675, an Abbe's number $v_d$'s number of at least 50 and a sag temperature of approximately 600° C. or lower.

Therefore, the optical part of the present invention, which is obtained by precision-press shaping a material formed of the optical glass of the present invention, can be easily mass-produced as optical parts having properties of a high refractive index and low-dispersion.

When the optical part of the present invention is for example, a lens, there can be obtained lenses of various sizes, such as a large lens having a diameter of greater than 20 mm, a small lens having a diameter of 20 mm or less, a micro lens having a diameter of 12 mm or less, and an ultra-micro lens having a diameter of 8 mm or less. These lenses are incorporated, for example, into cameras and VTRs when used.

EXAMPLES

The present invention will be explained with reference to Examples hereinafter.

Examples 1–16 and Comparative Examples 1–6

Predetermined amounts of predetermined raw materials were weighed so as to obtain a composition shown in Table 1, 2, 3 or 4, and the raw materials were mixed to obtain a formulated raw material. The formulated raw material was melted in a melting furnace at 1,150 to 1,350° C. to prepare a glass melt, and the glass melt was refined and stirred to obtain a homogeneous mixture. The homogeneous mixture was cast into a mold having a predetermined cavity and then gradually cooled to give an intended optical glass.

In the above case, as a raw material for boron oxide, $H_3BO_3$ was used, and as a raw material for aluminum oxide, $Al(OH)_3$ was used. As raw materials for the other components, carbonates, nitrates or oxides of cation elements constituting these components (oxides) were used.

The above-obtained optical glass was measured for a refractive index $n_d$, an Abbe's number $v_n$, a sag temperature $T_s$ and a liquidus temperature as follows. Tables 1 to 4 shows the results.

Refractive Index $n_d$ and Abbe's Number $v_n$

A glass melt cast into a mold was gradually cooled at a temperature decrease rate of −30° C./hour to obtain an optical glass, and the optical glass was measured.

Sag Temperature $T_s$

Measured with a thermal expansion measuring machine at a temperature elevation rate of 8° C./minute.

Liquidus Temperature L.T.

A predetermined number of samples were prepared in each of Examples and Comparative Examples, and the samples were placed in devitrification testing furnaces having a temperature gradient of 500 to 1,100° C., and after they were maintained for 30 minutes, they were cooled to room temperature. Then, these samples were observed through a microscope having a magnification of 100, and the lowest devitrification test temperature at which no formation of a crystal was found was taken as a liquidus temperature.

TABLE 1

|  | Ex. 1 | Ex. 2 | Ex. 3 | Ex. 4 | Ex. 5 |
| --- | --- | --- | --- | --- | --- |
| Essential components *1 |  |  |  |  |  |
| Boron oxide (B$_2$O$_3$) | 28 | 37 | 34 | 34 | 29 |
| Lanthanum oxide (La$_2$O$_3$) | 21 | 21 | 27 | 21 | 17 |
| Yttrium oxide (Y$_2$O$_3$) | 8 | 5 | 8 | 8 | 8 |
| Silicon oxide (SiO$_2$) | 15 | 5 | 9 | 9 | 9 |
| Lithium oxide (Li$_2$O) | 3 | 5 | 4 | 6.8 | 5 |
| Calcium oxide (CaO) | 11 | 7 | 3 | 1.0 | 16 |
| Zinc oxide (ZnO) | 8 | 8 | 8 | 4 | 8 |
| Gadolinium oxide (Gd$_2$O$_3$) | — | 5 | — | — | 3 |
| Zirconium oxide (ZrO$_2$) | 6 | 5 | 5 | 5 | 4 |
| Total content of Gd$_2$O$_3$ and ZrO$_2$ | 6 | 10 | 5 | 5 | 7 |
| Total content of essential components | 100 | 98 | 98 | 97.8 | 99 |

TABLE 1-continued

|  | Ex. 1 | Ex. 2 | Ex. 3 | Ex. 4 | Ex. 5 |
|---|---|---|---|---|---|
| Optical components *2 | | | | | |
| Sodium oxide ($Na_2O$) | — | — | — | — | — |
| Potassium oxide ($K_2O$) | — | — | — | — | — |
| Magnesium oxide (MgO) | — | — | — | — | — |
| Strontium oxide (SrO) | — | — | — | 2 | — |
| Barium oxide (BaO) | — | — | — | — | — |
| Tantalum oxide ($Ta_2O_5$) | — | — | — | — | — |
| Aluminum oxide ($Al_2O_3$) | — | — | 1 | — | — |
| Ytterbium oxide ($Yb_2O_3$) | — | — | — | — | 1 |
| Niobium oxide ($Nb_2O_5$) | — | 2 | 1 | — | — |
| Arsenic oxide ($As_2O_3$) | — | — | — | — | — |
| Antimony oxide ($Sb_2O_3$) | — | — | — | 0.2 | — |
| Grand total of contents | 100 | 100 | 100 | 100 | 100 |
| Refractive index $n_d$ | 1.6921 | 1.6980 | 1.6935 | 1.6816 | 1.6903 |
| Abbe's number $\nu_d$ | 53.3 | 52.3 | 53.0 | 53.5 | 52.6 |
| Sag temperature $T_s$ (° C.) | 590 | 540 | 550 | 530 | 530 |
| Liquidus temperature L. T (° C.) | 950 | 930 | 970 | 930 | 920 |

*1, *2: Units of values in each column are "wt %".

TABLE 2

|  | Ex. 6 | Ex. 7 | Ex. 8 | Ex. 9 | Ex. 10 |
|---|---|---|---|---|---|
| Essential components *1 | | | | | |
| Boron oxide ($B_2O_3$) | 33 | 31 | 33 | 33 | 31 |
| Lanthanum oxide ($La_2O_3$) | 21 | 21 | 21 | 21 | 22 |
| Yttrium oxide ($Y_2O_3$) | 8 | 8 | 8 | 8 | 9 |
| Silicon oxide ($SiO_2$) | 6 | 9 | 7 | 7 | 9 |
| Lithium oxide ($Li_2O$) | 3 | 5.8 | 3 | 3 | 4 |
| Calcium oxide (CaO) | 10 | 6 | 10 | 10 | 10 |
| Zinc oxide (ZnO) | 17 | 8 | 13 | 13 | 9 |
| Gadolinium oxide ($Gd_2O_3$) | 1 | — | 1 | 1 | 3 |
| Zirconium oxide ($ZrO_2$) | — | 5 | 3 | 3 | 1 |
| Total content of $Gd_2O_3$ and $ZrO_2$ | 1 | 5 | 4 | 4 | 4 |
| Total content of essential components | 99 | 93.8 | 99 | 99 | 98 |
| Optical components *2 | | | | | |
| Sodium oxide ($Na_2O$) | — | — | 1 | — | — |
| Potassium oxide ($K_2O$) | — | — | — | 1 | — |
| Magnesium oxide (MgO) | 1 | — | — | — | — |
| Strontium oxide (SrO) | — | — | — | — | — |
| Barium oxide (BaO) | — | 6 | — | — | — |
| Tantalum oxide ($Ta_2O_5$) | — | — | — | — | 2 |
| Aluminum oxide ($Al_2O_3$) | — | — | — | — | — |
| Ytterbium oxide ($Yb_2O_3$) | — | — | — | — | — |
| Niobium oxide ($Nb_2O_5$) | — | — | — | — | — |
| Arsenic oxide ($As_2O_3$) | — | 0.2 | — | — | — |
| Antimony oxide ($Sb_2O_3$) | — | — | — | — | — |
| Grand total of contents | 100 | 100 | 100 | 100 | 100 |
| Refractive index $n_d$ | 1.6892 | 1.6858 | 1.6920 | 1.6915 | 1.6929 |
| Abbe's number $\nu_d$ | 53.0 | 52.6 | 53.0 | 53.0 | 53.5 |
| Sag temperature $T_s$ (° C.) | 550 | 540 | 560 | 560 | 550 |
| Liquidus temperature L. T (° C.) | 940 | 940 | 930 | 930 | 950 |

*1, *2: Units of values in each column are "wt %".

TABLE 3

|  | Ex. 11 | Ex. 12 | Ex. 13 | Ex. 14 | Ex. 15 | Ex. 16 |
|---|---|---|---|---|---|---|
| Essential components *1 | | | | | | |
| Boron oxide ($B_2O_3$) | 33 | 34 | 34 | 31 | 36 | 34.5 |
| Lanthanum oxide ($La_2O_3$) | 20 | 24 | 25 | 18 | 25 | 21 |
| Yttrium oxide ($Y_2O_3$) | 8 | 8 | 10 | 9.5 | 6 | 8 |
| Silicon oxide ($SiO_2$) | 8 | 7 | 9 | 11 | 6 | 7 |
| Lithium oxide ($Li_2O$) | 4 | 3.5 | 4 | 5.5 | 5 | 3 |
| Calcium oxide (CaO) | 10 | 7.5 | 3 | 11 | 6 | 10 |

TABLE 3-continued

|  | Ex. 11 | Ex. 12 | Ex. 13 | Ex. 14 | Ex. 15 | Ex. 16 |
|---|---|---|---|---|---|---|
| Zinc oxide (ZnO) | 11 | 9 | 8 | 7 | 8 | 13 |
| Gadolinium oxide ($Gd_2O_3$) | 2 | 3 | — | 2 | 4 | 1 |
| Zirconium oxide ($ZrO_2$) | 4 | 4 | 5 | 5 | 2 | 1.5 |
| Total content of $Gd_2O_3$ and $ZrO_2$ | 6 | 7 | 5 | 7 | 6 | 2.5 |
| Total content of essential components | 100 | 100 | 98 | 100 | 98 | 99 |
| Optical components *2 |  |  |  |  |  |  |
| Sodium oxide ($Na_2O$) | — | — | — | — | — | — |
| Potassium oxide ($K_2O$) | — | — | — | — | — | — |
| Magnesium oxide (MgO) | — | — | — | — | — | — |
| Strontium oxide (SrO) | — | — | — | — | — | — |
| Barium oxide (BaO) | — | — | — | — | — | — |
| Tantalum oxide ($Ta_2O_5$) | — | — | — | — | — | — |
| Aluminum oxide ($Al_2O_3$) | — | — | 1 | — | — | — |
| Ytterbium oxide ($Yb_2O_3$) | — | — | — | — | — | — |
| Niobium oxide ($Nb_2O_5$) | — | — | 1 | — | 2 | 1 |
| Arsenic oxide ($As_2O_3$) | — | — | — | — | — | — |
| Antimony oxide ($Sb_2O_3$) | — | — | — | — | — | — |
| Grand total of contents | 100 | 100 | 100 | 100 | 100 | 100 |
| Refractive index $n_d$ | 1.6936 | 1.6975 | 1.6925 | 1.6833 | 1.6981 | 1.6922 |
| Abbe's number $v_d$ | 53.5 | 53.6 | 53.2 | 52.5 | 52.7 | 53.3 |
| Sag temperature $T_s$ (° C.) | 550 | 570 | 550 | 545 | 545 | 560 |
| Liquidus temperature L. T (° C.) | 940 | 940 | 930 | 930 | 950 | 940 |

*Units of values in each column are "wt %".

TABLE 4

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Glass components *1 |  |  |  |  |  |  |
| Boron oxide ($B_2O_3$) | 30 | 30 | 30 | 34 | 32.5 | 29 |
| Lanthanum oxide ($La_2O_3$) | 30 | 25 | 15 | 20 | 23 | 21 |
| Yttrium oxide ($Y_2O_3$) | — | — | — | — | — | 10 |
| Silicon oxide ($SiO_2$) | 10 | 10 | 10 | 6 | 7 | 6 |
| Lithium oxide ($Li_2O$) | 5 | 5 | 5 | 3 | 2 | 2 |
| Calcium oxide (CaO) | 15 | 5 | 5 | 8 | — | 10 |
| Zinc oxide (ZnO) | — | — | — | — | 12 | 1 |
| Gadolinium oxide ($Gd_2O_3$) | — | 15 | 30 | 10 | 8 | 16 |
| Zirconium oxide ($ZrO_2$) | — | — | — | — | — | — |
| Sodium oxide ($Na_2O$) | — | — | — | — | 1 | — |
| Potassium oxide ($K_2O$) | — | — | — | — | — | 5 |
| Magnesium oxide (MgO) | — | — | — | — | 4.2 | — |
| Strontium oxide (SrO) | — | — | — | — | 9.3 | — |
| Barium oxide (BaO) | 10 | 10 | 5 | 19 | — | — |
| Tantalum oxide ($Ta_2O_5$) | — | — | — | — | — | — |
| Aluminum oxide ($Al_2O_3$) | — | — | — | — | — | — |
| Ytterbium oxide ($Yb_2O_3$) | — | — | — | — | — | — |
| Niobium oxide ($Nb_2O_5$) | — | — | — | — | — | — |
| Arsenic oxide ($As_2O_3$) | — | — | — | — | 1 | — |
| Antimony oxide ($Sb_2O_3$) | — | — | — | — | — | — |
| Grand total of contents | 100 | 100 | 100 | 100 | 100 | 100 |
| Refractive index $n_d$ | 1.6779 | 1.6852 | 1.6846 | 1.6781 | 1.6781 | *2 |
| Abbe's number $v_d$ | 54.9 | 55.4 | 55.8 | 56.1 | 54.7 |  |
| Sag temperature $T_s$ (° C.) | 538 | 549 | 550 | 548 | 585 |  |
| Liquidus temperature L. T (° C.) | 1010 | 1010 | 1010 | 1000 | 1000 |  |

*1: Units of values in each column are "wt %".
*2: Unmeasurable due to devitrification during melting.

As shown in Tables 1 to 3, the optical glasses obtained in Examples 1 to 16 are high-refractivity low-dispersion glasses having a refractive index $n_d$ of 1.6816 to 1.6981 and an Abbe's number $v_d$ of 52.3 to 53.6. Further, these optical glasses have a sag temperature $T_s$ of as low as 530 to 590° C. and a liquidus temperature L.T. of as low as 920 to 970° C.

Therefore, the optical glasses obtained in Examples 1 to 16 are suitable for mass-producing optical parts having properties of a high refractive index and low dispersion by press shaping or precision-press shaping.

The optical glasses obtained in Comparative Examples 1 to 4 correspond to high-refractivity low-dispersion glasses in Examples 5, 6, 8 and 9 described in Japanese Patent 2,616, 958, while they have a liquidus temperature L.T. of as high as 1,010° C. or 1,000° C. The optical glass obtained in Comparative Example 5 corresponds to a high-refractivity low-dispersion glass in Example 1 described in JP-A-8-259257, while it has a liquidus temperature L.T. of as high as 1,000° C. The optical glass which was intended to be obtained in Comparative Example 6 corresponds to a glass in example 2 described in JP-A-8-259257, while it was not obtained since it devitrified when its raw materials were melted. Judging from the fact that the devitrification took place, the glass described in Example 2 of the above JP-A-8-259257 has a considerably high liquidus temperature L.T.

Since the optical glasses having compositions shown in Comparative Examples 1 to 6 have high liquidus temperatures L.T. as described above, they are poor in the mass-productivity of themselves. It is therefore difficult to mass-produce desired shaped articles when these optical glasses are used as a press shapeable material or a precision-press shapeable material.

Example 17
(Preparation of Precision-Press Shapeable Material)

There was prepared a shaping mold having a concave portion having a predetermined form and an air-blowing narrow hole opened in the bottom of the concave portion, in which the perpendicular cross section of the concave portion was opened upwardly (upwardly in a perpendicular direction during use) to have the form of a trumpet. A glass melt of an optical glass having the composition in Example 1 was prepared. A spherical shaped article was obtained from the above glass melt according to the shaping method disclosed in JP-B-7-51446.

For the above shaping, shaping conditions shown in "Experimental Results 1" in the above JP-B-7-51446 were employed. That is, the concave portion of the above shaping mold had a "broadening angle θ" of 15°, and the above narrow hole had a diameter of 2 mm. Further, the glass melt was directed to a site right above the above shaping mold through a flow pipe which was disposed so as to face its flow outlet downwardly in a perpendicular direction and had an inner diameter of 1 mm and an end outer diameter of 2.5 mm, and the glass melt was allowed to drop of its own weight therefrom in a state where the glass melt had a viscosity of 0.8 Pa·s. And, air was continuously blown through the gas-blowing narrow hole of the shaping mold at a rate of 1 liter/minute beforehand, and the blowing of air was continued until a glass mass which was formed by allowing the glass melt to drop of its own weight from the above flow pipe was fully cooled.

Under the above conditions, the glass mass which dropped of its own weight from the flow pipe was received in the concave portion without almost any contact to inner surface of the concave portion of the shaping mold, and they were whirled in a state where they were floated without almost any contact, to form a sphere.

The above-obtained spherical shaped product had the form of a sphere having a sphericity of 4.92 mm±0.04 mm, and neither damage nor soiling were observed on its surface. The above shaped article is suitable as a shapeable material (precision-press shapeable material), for example, for obtaining a high-refractivity high- or intermediate-dispersion non-spherical lens by precision-press shaping.

Example 18
(Preparation of Optical Part)

A non-spherical lens was obtained from the precision-press shapeable material obtained in Example 17 by precision-press shaping the material by means of a precision-press shaping machine shown in FIG. 1, under conditions where the shaping temperature was set a temperature at which the above material had a viscosity (glass viscosity) of $10^8$ Pa·s, the pressing pressure was set at 180 kg/cm² and the pressing time was set for 10 seconds.

The so-obtained non-spherical lens had a remarkably high accuracy.

Effect of the Invention

As explained above, the optical glass of the present invention has properties of a high refractive index and high dispersion and can be easily obtained as an optical glass having both a low sag temperature $T_s$ and a low liquidus temperature L.T.

What is claimed is:

1. An optical glass comprising, as essential components, boron oxide, lanthanum oxide, yttrium oxide, silicon oxide, lithium oxide, calcium oxide, zinc oxide and at least one of gadolinium oxide and zirconium oxide, wherein the contents of the essential components in % by weight are 28 to 37% of boron oxide, 17 to 27% of lanthanum oxide, 5 to 10% of yttrium oxide, 5 to 16% of silicon oxide, 3 to 7% of lithium oxide, 2 to 16% of calcium oxide, 4 to 17 of zinc oxide, 0 to 5% of gadolinium oxide and 0 to 6% of zirconium oxide, the total content of the gadolinium oxide and the zirconium oxide being 0.5 to 10%, the total content of the essential components being at least 93%, and the contents of the optional components in % by weight are 0 to 3% of sodium oxide, 0 to 3% of potassium oxide, 0 to 3% of magnesium oxide, 0 to 3% of strontium oxide, 0 to 6% of barium oxide, 0 to 3% of tantalum oxide, 0 to 3% of aluminum oxide, 0 to 3% of ytterbium oxide, 0 to 3% of niobium oxide, 0 to 2% of arsenic oxide and 0 to 0.2% of antimony oxide.

2. The optical glass of claim 1, wherein the contents of the essential components by % by weight are 30 to 36% of boron oxide, 18 to 25% of lanthanum oxide, 6 to 10% of yttrium oxide, 6 to 12% of silicon oxide, 3 to 6% of lithium oxide, 5 to 12% of calcium oxide, 7 to 13% of zinc oxide, 0.5 to 4% of gadolinium oxide and 1 to 5% of zirconium oxide, the total content of the gadolinium oxide and the zirconium oxide being 1.5 to 8%, the total content of the essential components being at least 95%, and which contains, as an optional component, 0 to 2% by weight of niobium oxide.

3. The optical glass of claim 1, which has a refractive index $n_d$ of at least 1.675, an Abbe's number $v_d$ of at least 50, a sag temperature $T_s$ of 600° C. or lower and a liquidus temperature L.T. of less than 1,000° C.

4. A precision-press shapeable material formed of the optical glass recited in claim 1.

5. An optical part produced by precision-press shaping a material formed of the optical glass recited in claim 1, 2 or 3 into a part in a mold comprising an upper mold member and a lower mold member and having a cavity form.

* * * * *